3,012,047
PRODUCTION OF ESTERIFICATION PRODUCT
George E. Woods, Wilmington, Del., assignor to Atlas Chemical Industries, Inc., a corporation of Delaware
No Drawing. Filed Dec. 24, 1958, Ser. No. 782,666
3 Claims. (Cl. 260—410.8)

This invention relates to the production of surface active agents and more particularly to the method of preparation of edible emulsifying agents comprising the esterification products of glycerol with mixed lactic and fatty acids.

It is an object of the invention to provide an improved manufacturing process for the production of surface active agents.

Another object is to provide a process for producing edible grade mixed esters from glycerol, lactic and fatty acids, which process avoids the necessity of washing the esterifification product to eliminate by-products of objectionable taste and odor.

A further object is to provide a process for producing such mixed esters in which the reactants are utilized most economically.

The above and other objects will become more apparent in the course of the following description and in the appended claims.

In the art of edible emulsifiers, particularly emulsifiers useful as shortening improvers, esterification products of mixed hydroxy acid-fatty acid with glycerol have been found to be of considerable value. Esters in which the hydroxy acid radical is lactate and the fatty acid radical palmitate have found especial favor for this purpose.

The patent literature contains several references to such esters, their production, and their method of utilization. Mention may be made in this respect to U.S. Patents 2,329,166, Tucker; 2,480,332, Little; 2,509,414, Barsky; and 2,690,971, Iveson.

Prior workers in this field have found that the direct esterification products of glycerol with lactic acid and palmitic acid, as well as products made by reacting lactic acid with the glycerolysis product of fats rich in palmitic acid, contain by-products which impart an objectionable taste to the emulsifying agents and to food products in which they are used. According to the prior art, the objectionable by-products are water-soluble, and proposed methods of production have included the step of washing the esterification product with an aqueous medium to remove them. The washing of surface active agents is a troublesome operation because of difficulty in separating the aqueous and organic liquid phases unless a salt is dissolved in the former. When salt solution is employed as the washing agent the recovery and utilization of the water-soluble components is not economically feasible.

In accordance with the present invention an improvement in the process of preparing esterification products from glycerol, lactic acid and a fatty acid is provided whereby emulsifying agents, acceptable for use in food products with respect to taste and odor, are produced without the necessity of washing with aqueous solution. Moreover, and very importantly, virtually all of the reactants not retained in the finished product are recovered in a form suitable for recycling for esterification in a subsequent batch thus effecting a large economy in the overall process.

The foregoing objects and advantages are realized by forming a glycerol-lactic acid-fatty acid esterification product comprising, per molar proportion of glycerol radical, from about 0.5 to 1.5 molar proportions of lactic acid radical and from about 0.75 to 1.5 molar proportion of a fatty acid radical containing from 16 to 18 carbon atoms, and subjecting it to a vacuum-steam stripping process.

The aforesaid esterification product may be prepared in conventional manner as, for example, by heating appropriate proportions of glycerol, lactic acid and fatty acid together under water-removing conditions. Alternatively an approximately mono-fatty acid ester of glycerol may first be prepared by heating together an excess of glycerol with fatty acid under water-removing conditions with subsequent deglycerination of the reaction mixture until the ratio of glycerol to fatty acid radical falls within the aforesaid range. The partial ester is then esterified with the indicated proportion of lactic acid, preferably under partial reflux, and the mixed ester steam-vacuum stripped as described more fully below. Instead of preparing the approximate monoester as described immediately above it is also possible to start with a fat and convert it to a partial glyceride by reacting with glycerol in manner well known to the art.

In accordance with this invention, an esterification product, prepared by one of the foregoing methods or by other suitable means and containing molar proportions of glycerol, lactate and acid radicals of 16 to 18 carbon fatty acids in the proportions indicated hereinbefore, is subjected to a vacuum-steam stripping process, the treatment being continued until the ratio of fatty acid radical to glycerol radical is increased by at least about 0.05 unit and lies between about 1.25 and 1.6. The temperature and pressure during the stripping operation may vary over a considerable range in accordance with accepted practice. In general temperatures ranging from 180° to 245° C. and absolute pressures ranging from 30 millimeters of mercury downward are useful. As will be readily recognized by those skilled in the art pressures in the higher end of the range should not be employed with temperatures in the lower end of the indicated range. A particularly satisfactory set of conditions is to heat at 220° C. under pressure of 10 millimeters of mercury while blowing steam through the charge.

The rate at which steam is blown through the charge is not critical and may be varied over a wide range. The upper end of the range has natural limitations imposed by the evacuation capacity and by the problem of entrainment resulting from too vigorous agitation. As little as 0.1% per hour by weight, based on the reaction mass, may be successfully employed although it is preferred to employ from 0.5 to 1.0% per hour. Still faster sparging rates up to 3% per hour could be profitably employed but, as has been indicated, such high rates introduce problems of design which are difficult or expensive to overcome.

The strippings are rich in glycerol and lactic acid radicals and contain relatively smaller amounts of fatty acid radical. They may be readily condensed by passing them through a condenser jacketed with warm water (to prevent condensation of water vapor) and are suitable for re-use to introduce glycerol, lactate and fatty acid radicals in the formation of further esterification product of the type above described. Thus, the emulsifier is produced with very little loss of raw materials to by-products and/or waste.

The emulsifiers so produced are mixed partial esters of glycerol, fatty acid and lactic acid containing per mol of glycerol from about 1.25 to 1.6 molar proportions of fatty acid radical and from about 0.4 to about 1.5 molar proportions of lactate radical. They are free of objectionable taste and odor and are suitable for use as food emulsifiers. The more highly esterified products, for example, those containing more than about 2.5 molar proportions of total lactate and palmitate radical per mol of glycerol, are quite soluble in vegetable oils and may be incorporated in refined cottonseed oil or corn oil to form improved all-purpose liquid household shortenings. Particularly preferred as improvers for plastic shortening and in dry cake mixes are those products containing from about 0.6 to about 1.0 molar proportion of lactate radical per mol of glycerol radical.

The preparation of specific emulsifiers embodying the improvement of the present invention is described in the following examples. The examples are for the purpose of clarification and illustration only and are not to be interpreted as defining or limiting the invention in any way.

EXAMPLE I

A. *Preparation of the esterification product*

One hundred twenty molar proportions of glycerol and 95.2 molar proportions of a commercial grade of palmitic acid (Neofat 16) were heated together under partial reflux while sparging with steam to terminal conditions of 245° C. and 450 mm. pressure. The pressure was then decreased, without supplying heat to the vessel, to drop the temperature to about 200° C. while removing unreacted glycerol by distillation. 43.5 molar proportions of glycerol were so removed and reserved for charging to the next batch. To the partial palmitate ester of glycerol in the reaction vessel after increasing the pressure to about 500 mm., there was added 63.8 molar proportions of lactic acid in the form of an 80% food grade commercial lactic acid, plus steam-vacuum strippings from a previous batch, which strippings contained 1.1 molar equivalents of palmitate radical, 16.6 molar equivalents of glycerol radical, and 12.3 molar equivalents of lactate radical. During the foregoing addition, steam was passed through the charge and the vessel was equipped with a partial reflux condenser. The mixture was heated with continued steam sparging under gradually reduced pressure and partial reflux (to prevent loss of lactic acid) to terminal condition of 210° C., 100 millimeters pressure, and an acid number of 7. In the resulting esterification product the molar proportions of lactate and palmitate radical per mol of glycerol were approximately 0.82 and 1.04, respectively.

B. *Vacuum-steam stripping*

The condenser system was changed to take off rather than to reflux distillate and the vacuum was gradually increased until the pressure approached 10 millimeters while raising the temperature to 220° C. Steam was led through the charge at the rate of about 0.5% per hour by weight of the reaction mass to hasten the removal of volatiles. After about an hour's stripping the condensate contained 1.5 molar proportions of palmitate radical, 19.4 molar proportions of glycerol and 13.4 molar proportions of lactate radical respectively. It was reserved for recycling to the next batch to be produced.

The product remaining in the reaction vessel was cooled and discharged for packaging. It was a firm waxy solid suitable for flaking on a chilled roll if desired. Its analytical properties were as follows:

Acid number_____ 0.7
Saponification No_____ 258
Hydroxyl number_____ 184
Free glycerol_____percent__ 0.6

It imparted no objectionable taste to shortening when incorporated therein at the level of 10% and was found to be an excellent improving agent for shortenings, especially in the production of cakes.

EXAMPLE II 1600 grams (5.64 mols) of high purity stearic acid, 528 grams (5.72 mols) of U.S.P. glycerine and 426 grams (3.79 mols) of 80% food-processing grade lactic acid were charged into a 5-liter, 3-neck flask fitted with a thermometer, mechanical agitator, and a steam-heated partial reflux condenser. Also provided was a total condenser to collect vapors which passed through the partial reflux condenser, means for sparging the charge in the flask with steam, and means for applying vacuum to the reaction system.

Pressure in the flask was reduced to 100 millimeters of mercury (absolute) and heat was applied to degas the charge. When the temperature had risen to 95° C. the pressure was increased to 515 mm. with no steam passing through the charge and while maintaining the pressure at 515 mm. the temperature was taken to 210° C. in 65 minutes and held at that temperature for 2 hours. The reflux condenser was jacketed during this period with steam at atmospheric pressure and the total condenser with cold water. The acid number of the charge was 19.0. The pressure was gradually reduced in 25 minutes to 50 mm. while maintaining the temperature at 210° C. and these conditions were maintained until the total time at 210° C. was 190 minutes. The acid number had decreased to 5.1 and 286 grams of distillate containing 97.4% water, had collected in the receiver of the total condenser. By analysis the esterification product remaining in the reaction flask contained 0.675 molar proportions of lactate radical and 1.013 molar proportions of stearate radical per mol of glycerol radical.

The vacuum was then released with an inert gas, the partial condenser removed, and the apparatus set up to distil and condense higher boiling volatiles from the reaction mass while passing water vapor to the evacuation system. The pressure was reduced and the temperature increased while sparging the reaction mass with stream at a rapid bubbling rate. Distillate started over at 206° C. and 21 mm. of pressure. Distillation was continued for 40 minutes during which time the pressure was decreased to 4 millimeters and the temperature increased to 221° C. The distillate (Strippings) weighed 382 grams and comprised a mixture of glycerol, lactate, and stearate radicals in partial combination, suitable for reuse in the preparation of another batch of the esterification product. Its analysis was as follows:

Acid number_____ 17.6
Saponification No_____ 283
Hydroxyl number_____ 928
Water—percent _____ 0.39

The residue in the reaction flask (1830 grams) was a mixed esterification product of lactic acid, stearic acid and glycerol with the following analysis:

Acid number_____ 0.36
Saponification No_____ 219
Hydroxyl number_____ 140
Water _____ Trace
Free glycerol—percent_____ 0.2

Per mol of glycerol radical it contained 1.6 mols of stearate radical and 0.6 mol of lactate radical.

EXAMPLE III

The apparatus employed was similar to that described in Example II. 1470 grams (5.71 mols) of a commercial palmitic acid (Neofat 16) and 534 grams (5.76 mols( of glycerol were charged into the flask and heated under partial reflux and total condenser, first for 0.5 hour at 210° C. and 260 mm. pressure, then for 0.75 hour at 245° C. and 450 mm. pressure. The reaction mass was then cooled to about 205° C. and 646 grams (5.74 mols) of 80% food-processing grade lactic acid added gradually. The temperature dropped to 155° C. during the addition. Heat was then applied to take the temperature gradually to 210° C. while decreasing the pressure to 100 millimeters of mercury. These conditions were maintained for one hour to produce the esterification product characterized in the first column of the table below.

The reflux condenser was removed and the apparatus arranged for removal of volatiles. The reaction mass was vacuum stripped at approximately 210–230° C. while sparging with steam. First distillation was observed at 208° C. and 18 mm. pressure. Thirty minutes later, at 221° C. and 10 mm. the stripping was interrupted and sample removed for analysis. Stripping was resumed and a second sample removed, at 225° C. and 14 mm. pressure after an additional 30 minutes. Stripping was continued for another 35 minutes, the temperature rising to 231° C. while the pressure varied between 15 and 18 mm.

The samples removed and the final product were analyzed to indicate the progressive changes in composition as volatiles were removed. The results were as follows:

| Sample No. | Initial | 1 | 2 | Final |
|---|---|---|---|---|
| Vacuum Stripped, Min. | 0 | 30 | 60 | 95 |
| Acid No. | 4.4 | 1.4 | 2.0 | 0.7 |
| Saponification No. | 279 | 271 | 269 | 263 |
| Hydroxyl No. | 268 | 207 | 188 | 169 |
| Water, percent | 0.25 | 0.19 | 0.19 | 0.28 |
| Free Glycerol, percent | 2.5 | 1.1 | 0.72 | 0.55 |
| Mols Lactate/mol glycerol | 1.04 | 1.01 | 1.00 | .98 |
| Mols Palmitate/mol glycerol | 1.04 | 1.28 | 1.37 | 1.46 |

It may be noted that, when starting with approximately equi-molar proportions of the 3 reaction components, glycerol and lactic acid radicals are stripped out in approximately equal proportions and their ratio remains substantially unchanged while the ratio of palmitate to glycerol (and correspondingly to lactate) increases progressively.

The samples removed and final product were surface active agents of progressively decreasing hydrophilic character, all suitable for use as food emulsifiers and shortening improvers.

What is claimed is:

1. The process of preparing an edible emulsifying agent which comprises the steps of forming an esterification product of glycerol, a fatty acid containing from 16 to 18 carbon atoms, and lactic acid, said esterification product containing from about 0.5 to about 1.5 molar proportions of lactate radical and from about 0.75 to about 1.5 molar proportions of fatty acid radical per mol of glycerol, and subjecting the esterification product so-formed to vacuum-steam stripping until the molar proportion of fatty acid radical per mol of glycerol is increased by at least 0.05 and lies between about 1.25 and about 1.6, wherein a portion of the glycerol, fatty acid and lactic acid employed in forming the said esterification product is in the form of condensed vacuum-steam strippings obtained from a preceding similar process.

2. The process of claim 1 wherein the vacuum-steam stripping step is carried out at a temperature of from 180° to 245° C. and under a pressure no greater than 30 millimeters of mercury.

3. The process of claim 2 wherein the said fatty acid is palmitic acid.

References Cited in the file of this patent
UNITED STATES PATENTS

| 2,480,332 | Little | Aug. 30, 1949 |
| 2,634,278 | Kuhrt | Apr. 7, 1953 |

OTHER REFERENCES

Bailey: Industrial Oil and Fat Products, 2nd Edition, 1951, pages 767 to 794.